Patented Jan. 21, 1930

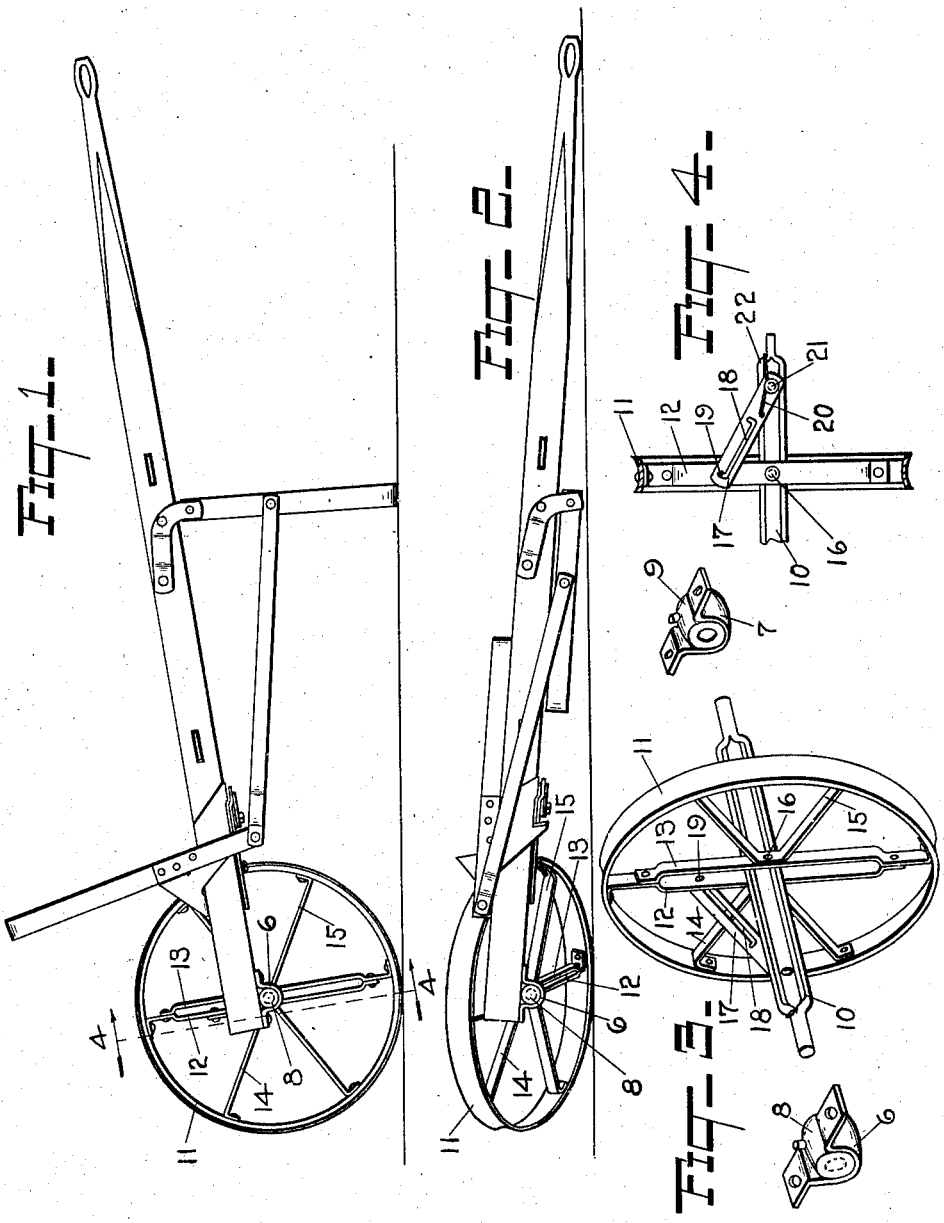

1,744,156

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

FOLDING VEHICLE WHEEL

Original application filed April 23, 1925, Serial No. 25,276. Divided and this application filed December 13, 1928. Serial No. 325,745.

My invention relates to folding wheels for vehicles foldable to save space in storage or for transportation, and has for its object production of a wheel adapted to be folded on its axle whether in use or not, and with effective means for locking it in operative or folded position.

Referring to the drawings in which similar numerals indicate identical parts—

Figure 1 is a side elevation of my improved wheel in use.

Figure 2 is a side view of the wheel folded.

Figure 3 is a perspective view of the wheel unfolded and ready to be mounted on a vehicle, and Figure 4 is a section on the line 4—4 of Figure 1.

This application is a division of my pending application, Serial No. 25,276, filed April 23, 1925. I have shown the wheel mounted on a certain type of vehicle to more fully illustrate its practical value for the purpose stated. Bearings 6 and 7 have barrel-shaped bushings 8 and 9 in which are journaled the ends of an axle 10; the axle 10 is made from I-beam stock, but may be of ordinary flat bar steel. The ends of the axle are diminished and rounded so as to be rotatable in the bushings 8 and 9. Upon the axle 10 is mounted the wheel composed of the tire 11 having a spoke extending diametrically of the tire and formed of parts 12 and 13 riveted together and to the tire and spaced apart for reception of the axle between them. Other spokes are provided, such as bars 14 and 15, which are bent to a V-shape and have their apices attached to the diametrical spoke by a bolt or rivet 16 which extends through the parts 12 and 13 and the axle, to operate as the pivot upon which the wheel is swung to folded or to operative position.

To retain the wheel in upright operative position I employ a latch 17, secured, at one end, to the axle 10 adjacent an end thereof and extending angularly to the spoke part 12; the latch has a longitudinal slot 18, with its ends turned at substantially right angles, and attaching the latch to the part 12 is a bolt or rivet 19 extending through the slot 18. A spring 20 is coiled about a bolt 21 which secures the latch 17 to the axle; one end of the spring engages with a shoulder 22 on the axle, and its opposite end is secured, in any suitable manner, to the latch, the spring operating to hold either turned end of the slot in engagement with the bolt, depending upon the position of the wheel whether in operative or folded position. The wheel 11 is shown, in Figure 4, held in operative position by the latch and to release it, for folding, the latch is to be lifted to disengage the turned end of the slot 18 from the bolt 19, so that the wheel can be swung on the bolt 16, the bolt 19 moving along the slot until it engages with the opposite turned end of the slot into which it is pressed and held by the spring 20. It is apparent that by reversing this operation the wheel can be again restored to its working position.

What I claim is:—

1. The combination of an axle adapted to be rotatably supported, a wheel on the axle rotatable therewith and foldable lengthwise thereof, and a latch device operating to hold the wheel in an operative position.

2. The combination of an axle adapted to be rotatably supported, a wheel on the axle rotatable therewith and foldable lengthwise thereof, and a latch device operating to hold the wheel in an operative position or folded.

3. The combination of an axle adapted to be rotatably supported, a wheel on the axle rotatable therewith and foldable lengthwise thereof, and a latch device pivotally mounted on the axle slidably connected to the wheel and adapted to hold the wheel in operative or folded position.

4. The combination of an axle adapted to be rotatably supported, a wheel on the axle rotatable therewith and foldable lengthwise thereof, a latch device pivotally mounted on the axle and slidably connected to the wheel, and means operating with the latch to firmly hold the wheel in operative or folded position.

5. The combination of an axle adapted to be rotatably supported, a wheel on the axle rotatable therewith and foldable lengthwise thereof, a latch device pivotally mounted on the axle, a slot in said device extending longitudinally thereof and terminating transversely of the device at each end, a bolt on a wheel spoke projecting through said slot and upon which the latch is slidable as the wheel is folded or returned to an operative position, said bolt adapted to engage with a transverse termination of the slot to hold the wheel in operative position and to engage with the opposite transverse termination of said slot to hold the wheel in a folded position, and a spring forcibly holding said latch in either engagement.

THEOPHILUS BROWN.